(12) United States Patent
Thompson

(10) Patent No.: US 6,176,230 B1
(45) Date of Patent: Jan. 23, 2001

(54) PORTABLE PROJECTILE LAUNCHER FOR PET AMUSEMENT

(76) Inventor: Ron Thompson, P.O. Box 324, Gig Harbor, WA (US) 98335-0324

( * ) Notice: Under 35 U.S.C. 154(b), the term of this patent shall be extended for 0 days.

(21) Appl. No.: 09/395,892

(22) Filed: Sep. 14, 1999

(51) Int. Cl.[7] ................................................. A63B 65/12
(52) U.S. Cl. .............................................. 124/16; 124/49
(58) Field of Search .............................. 124/6, 7, 16, 49, 124/54, 78

(56) References Cited

U.S. PATENT DOCUMENTS

| | | | |
|---|---|---|---|
| 4,185,608 | * | 1/1980 | Young et al. ..................... 124/49 X |
| 4,209,003 | * | 6/1980 | Sainsbury .................................. 124/7 |
| 4,721,091 | * | 1/1988 | Ridley et al. ........................ 124/7 X |
| 4,834,060 | | 5/1989 | Greene . |
| 4,995,374 | * | 2/1991 | Black ..................................... 124/54 |
| 5,097,985 | * | 3/1992 | Jones .................................. 124/49 X |
| 5,749,797 | * | 5/1998 | Sunseri et al. ..................... 124/16 X |

* cited by examiner

*Primary Examiner*—John A. Ricci
(74) *Attorney, Agent, or Firm*—Davis Wright Tremaine LLP

(57) ABSTRACT

There is disclosed a device for individually launching a plurality of projectiles. The device comprises a base having a launching mechanism housed therein, a feeder for transporting a projectile to the launching mechanism, and a receptacle attached to the base and operatively connected to the feeder, wherein the receptacle holds the projectiles until they are fed into the feeder.

17 Claims, 2 Drawing Sheets

PORTABLE PROJECTILE LAUNCHER FOR PET AMUSEMENT

FIELD OF THE INVENTION

The invention relates to devices that launch projectiles, and in particular to a device that launches balls to provide amusement and exercise for pets.

BACKGROUND

Pets have a lot of energy and need exercise to dissipate some of that energy and to stay fit. Pets usually get their exercise through playing fun games; chasing after, catching and retrieving some sort of projectile—usually a ball—is a particularly popular game which keeps a pet amused. Often, this game is played with or under the supervision of an adult; the adult throws the ball and the pet chases after the ball, sometimes catches it, and returns it to the adult to be thrown again. Unfortunately, though, a willing adult is not always present when the pet wants to play. What, then, is the poor pet to do? One possible solution for helping the pet is to provide them with a machine that automatically launches the ball, and to which they can return the ball to be launched again.

Unfortunately, there are very few machines which launch projectiles and can be used by a pet. Machines do exist for launching projectiles for recreational purposes; examples include tennis ball throwers used for tennis lessons, and baseball and softball throwers used in batting cages. But these machines have are unsuitable for use by pets. Existing machines are usually large, heavy contraptions which either cannot not be moved (often the case with baseball/softball machines) or must be put on a heavy base with wheels before it can be moved (often the case with tennis ball throwers). Thus, these machines are not portable and cannot easily be taken to yards, parks or other areas where children might play. Existing machines are also expensive and complex, making them impractical to buy for a pet, and rendering them too complex to be operated by a child and completely inoperable by a pet. These machines require some knowledge to properly select the machine's location and choose the correct operational settings (such as ball speed, and interval between ball launches). Moreover, they require some size and dexterity for operation; for example, the balls must usually be loaded into a large receptacle that would be out of reach for a pet, and which may be covered and locked for safety reasons, requiring some dexterity for opening. Finally, existing machines can pose a safety hazard, because they launch balls at high speeds that could injure pets.

Since existing projectile-launching machines are unsuitable for use by pets, there is a need for a projectile-launching machine which is portable and easily used by a pet, or for other similar purposes.

SUMMARY OF THE INVENTION

The present invention provides a device for individually launching a plurality of projectiles. The device comprises a base having a launching mechanism housed therein, a feeder for transporting a projectile to the launching mechanism, and a receptacle attached to the base and operatively connected to the feeder, wherein the receptacle holds the projectiles until they are fed into the feeder.

DETAILED DESCRIPTION OF THE INVENTION

Described below is an embodiment of the present invention. The embodiment illustrates one way in which the present invention can be implemented. Although the embodiment shown is described in the context of a machine used for throwing balls to keep a pet amused, the machine can also be used for other purposes. In the descriptions that follow, like numerals represent like elements in all figures. For example, where the numeral 10 is used to refer to a particular element in one figure, the numeral 10 appearing in any other figure refers to the same element.

Figure 1:
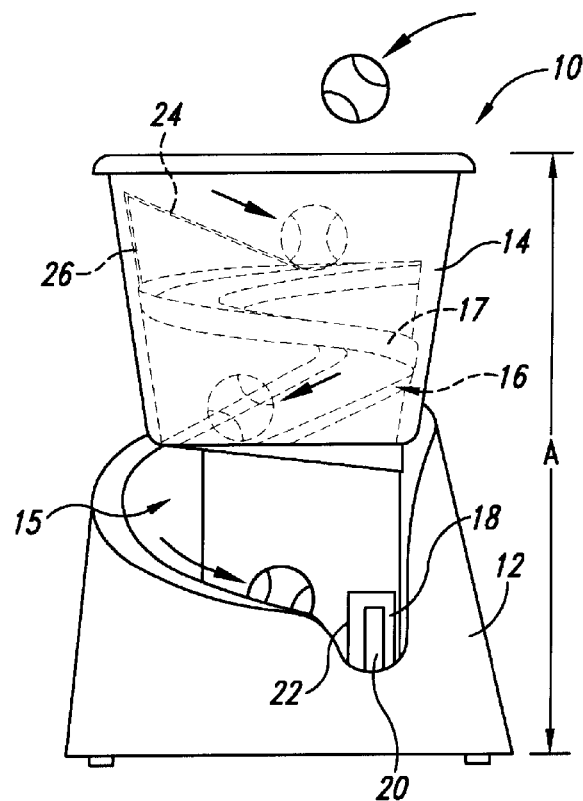
FIG. 1 is a front partial cutaway view of an embodiment of the inventive device.

FIG. 1 illustrates the front of an embodiment of the present device 10. The device 10 comprises a base 12 and a receptacle 14 positioned on, and attached to, the base 12. A feeder 16 extends from the interior of the receptacle 14 to the front of the base 12 and comprises a lower portion 15 and an upper portion 17. The device 10 is sized so that it can easily be operated by a pet such as a dog. Preferably, it has an overall height A of 18 inches, but the overall height may range from about 8 inches to about 18 inches The base 12 is generally shaped like a frustum and has a slot 18 which holds the projectiles (usually tennis balls, but they could also be other types of ball such as baseballs or softballs) until they are launched. The base also includes a lower portion 15 of feeder 16, which transports the balls to the slot; as further described below, the lower portion 15 of the feeder 14 forms an integral part of the base in this embodiment. Housed inside the base is a launching mechanism, which may be any of several types well known in the art. In the embodiment shown, the launching mechanism includes a hammer 20 which strikes the ball sitting in the slot 18, thus launching it into the air. The launching mechanism is adjustable so that the force with which the hammer strikes the balls, and the interval between striking the balls, can be adjusted. Preferably, the launch distance can be adjusted from about 20 feet to about 30 feet and the interval can be adjusted from about 7 seconds to about 45 seconds. The base 12 has a hole 22 therein through which the hammer 20 passes to strike the ball sitting in the slot 18. The base can be made of any material, although molded plastic is preferred because it comes in different colors and is easily made into complex shapes.

The receptacle 14 is attached to the base 12 and is designed to hold a plurality of balls to be launched. The receptacle 14 is bucket-shaped, and has mounted therein a diverter 24. The diverter 24 is semi-circular in shape and has its curved edge attached to an interior side 26 of the receptacle 14. Both the receptacle 14 and the diverter 24 may be made of any material, but are preferably made of molded plastic.

The feeder 16 is a gravity-feed mechanism comprising a helical channel with a vertically-oriented axis. The feeder includes a lower portion 15 and an upper portion 17. Together, the upper portion 17 and lower portion 15 operate with the force of gravity to transport balls from the interior of the receptacle 14 to the slot 18 for launching. The upper portion 17 projects into the interior of the receptacle so that balls placed in the receptacle will roll down the upper portion 17 of the feeder and onto the lower portion 15. The middle of the diverter 24 attaches to the center of the top portion 17 of the feeder, and helps direct balls placed in the receptacle into the feeder without clogging it. The lower portion 15 of the feeder is a channel integrally molded into the base 12 along an exterior side thereof. The lower portion 15 wraps at least part of the way around the base, starting where the upper portion 17 leaves off and ending at the slot 18. The feeder need not, however, have two portions as shown; an arrangement where the feeder is a single piece from the interior of the receptacle to the slot is possible. The entire feeder could also be molded as an integral part of the base.

Figure 2:
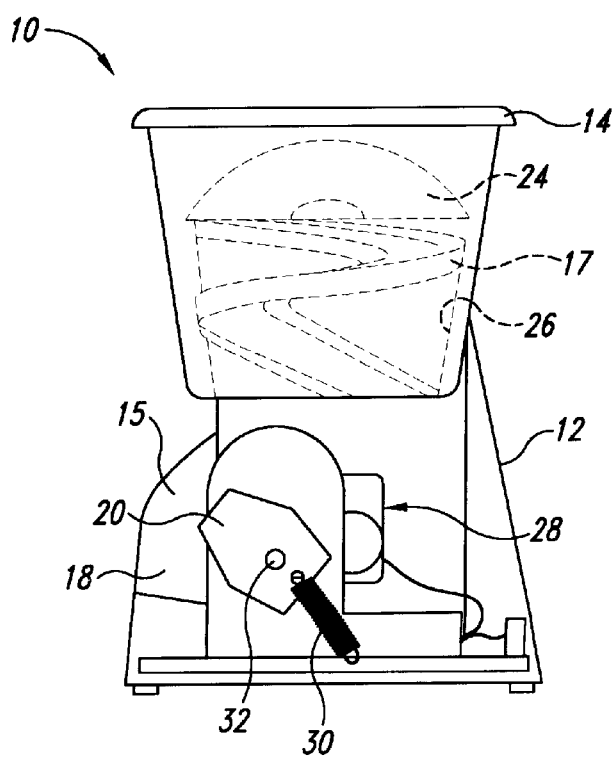
FIG. 2 is a side partial cutaway view of the embodiment of the inventive device shown in FIG. 1.

FIG. 2 illustrates a side view of the device 10, showing the position of the launching mechanism 28 within the base 12. The launching mechanism can be one of many known in the art, but as shown is an electrically operated launcher which includes a hammer 20 loaded by a spring 30. As the hammer revolves clockwise around the axis 32, the spring 30 is loaded and, at some point, the spring spins the hammer quickly around the axis 32 until it strikes the ball sitting in the slot 18. The feeder 14 transports balls from the receptacle 14 to the slot 18 for launching.

Figure 3:
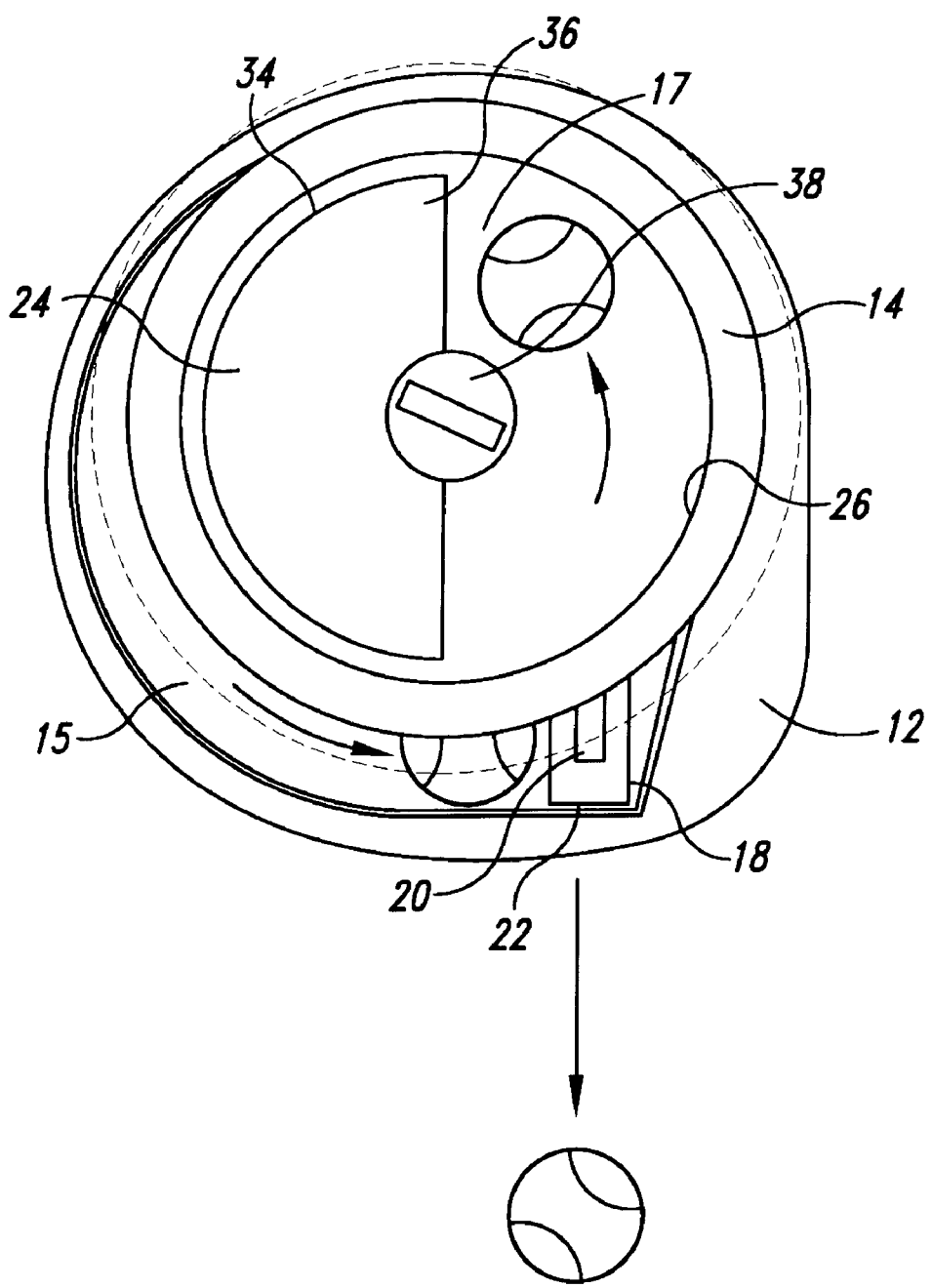
FIG. 3 is a top plan view of the embodiment of the inventive device shown in FIG. 1.

FIG. 3 illustrates the arrangement of the feeder in the device 10. The upper portion 17 of the feeder is positioned in the interior of the receptacle 14. The diverter 24 is positioned inside the receptacle 14 with its semi-circular side 34 attached to the interior side of the receptacle. The center of the straight side 36 of the diverter is attached to the center 38 of the upper portion of the feeder. The diverter channels the balls into the feeder in such a way that they do not clog the feeder. The balls leave the receptacle on the upper portion 17 of the feeder and spiral around until they are deposited into the lower portion 15 of the feeder. The lower portion of the feeder then transports the balls to the slot 18 where they will be launched when struck by the hammer 20.

In operation, the entire device is carried to a suitable position in a yard or a park. The launch distance and the interval between launches is set, the device is put on the ground, and several balls are placed in the receptacle 14. Since the feeder 16 is a helix with a vertically-oriented axis, gravity pulls the balls from the receptacle 14 down and around the feeder 16 until they get to the slot 18. Once in the slot 18, the ball sits there until the launching mechanism moves through its cycle and the hammer strikes the ball with the pre-set force, launching the ball into the air. The pet using the device then chases the launched ball, catches it (if they're fast) and return to the device and places the ball in the receptacle 14. The pet then waits for the next ball to be launched so that they can chase after and retrieve it. When the pet is finished playing, the launching mechanism is simply switched off and the device can be carried to a new location or stored.

The device described herein has several advantages compared to existing projectile-launching machines such as tennis ball and baseball throwers. Among other things, the present device is lightweight because of its size and construction; it is small enough and simple enough to be used by a pet; it is easily portable; and it is inexpensive. The device is also useful to provide amusement and a moderate amount of exercise to disabled or elderly persons.

An embodiment of the present invention has been described. A person skilled in the art, however, will recognize that many other embodiments are possible within the scope of the claimed invention. For this reason, the scope of the invention is not to be determined from the description of the embodiment, but must instead be determined solely from the claims that follow.

What is claimed is:

1. A device for individually launching a plurality of projectiles comprising:
   a base having a launching mechanism housed therein, and an exterior side;
   a gravity-operated feeder for transporting the projectiles to the launching mechanism; and
   a receptacle having an interior side and an exterior side and being attached to the base and operatively connected to the feeder, wherein the receptacle holds the plurality of projectiles until they are fed into the feeder and is adapted for a pet to be able to place projectiles therein, wherein the feeder comprises a helical track having a vertically-oriented axis and is positioned partially within the receptacle and partially along the exterior side of the base.

2. The device of claim 1 wherein the portion of the feeder along the outside surface of the base is intergrally molded into the base.

3. The device of claim 1 further comprising a diverter attached to the interior side of the receptacle to keep the projectiles from clogging the feeder.

4. The device of claim 3 wherein the diverter has a semi-circular shape and is attached to the interior side of the receptacle along the circular part of the diverter's circumference.

5. The device of claim 1 wherein the interval between launches can be varied from about 7 seconds to about 45 seconds.

6. The device of claim 1 wherein the launching mechanism can be adjusted to vary the launch distance of the projectile.

7. The device of claim 6 wherein the launch distance is from about 20 feet to about 30 feet.

8. The device of claim 1 wherein an overall height of the device is chosen such that a pet or small child can place a projectile in the receptacle.

9. The device of claim 8 wherein the overall height of the device is from about 8 inches to about 18 inches.

10. A device operable by a pet to individually launch a plurality of projectiles comprising:
    a base comprising a slot for holding a projectile until launched, and a launching mechanism housed therein having a hammer to periodically strike a projectile while it sits in the slot;
    a receptacle attached to the base for holding the plurality of projectiles, wherein the receptacle is adapted for a pet to be able to place projectiles therein;
    a gravity-operated feeder extending between the receptacle and the slot for transporting the projectiles from the receptacle to the slot; and
    a diverter attached to an interior side of the receptacle to keep the projectiles from clogging the feeder, wherein the diverter is semi-circular and is attached to the inside of the receptacle along the circular part of the diverter's circumference.

11. The device of claim 10 wherein the hammer extends through a hole in the base at the end of the slot to strike the projectile.

12. The device of claim 10 wherein the feeder is a helical channel having a vertically-oriented axis and is positioned partially within the receptacle and partially along an exterior side of the base.

13. The device of claim 12 wherein the portion of the feeder along the outside surface of the base is integrally molded into the base.

14. The device of claim 10 wherein the interval between launches can be varied from about 7 seconds to about 45 seconds.

15. The device of claim 10 wherein the launching mechanism can be adjusted to vary the launch distance of the projectile.

16. The device of claim 15 wherein the launch is from about 20 feet to about 30 feet.

17. The device of claim 10 wherein an overall height of the device is from about 8 inches to about 18 inches.

* * * * *